United States Patent
Smathers et al.

(10) Patent No.: US 11,455,775 B2
(45) Date of Patent: Sep. 27, 2022

(54) 3D IMAGING

(71) Applicant: Hewlett-Packard Development Company, L.P., Spring, TX (US)

(72) Inventors: Kevin Smathers, Palo Alto, CA (US); Ian N Robinson, Palo Alto, CA (US); Mary Baker, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/311,015

(22) PCT Filed: Mar. 22, 2019

(86) PCT No.: PCT/US2019/023514
§ 371 (c)(1),
(2) Date: Jun. 4, 2021

(87) PCT Pub. No.: WO2020/197528
PCT Pub. Date: Oct. 1, 2020

(65) Prior Publication Data
US 2022/0020212 A1    Jan. 20, 2022

(51) Int. Cl.
*G06T 19/00*    (2011.01)
*G06T 17/20*    (2006.01)
*G06T 7/579*    (2017.01)

(52) U.S. Cl.
CPC .............. *G06T 17/20* (2013.01); *G06T 7/579* (2017.01); *G06T 19/006* (2013.01)

(58) Field of Classification Search
None
See application file for complete search history.

(56) References Cited

U.S. PATENT DOCUMENTS

| | | |
|---|---|---|
| 8,766,977 B2 | 7/2014 | Kim et al. |
| 9,071,829 B2 | 6/2015 | Michot et al. |
| 9,142,024 B2 | 9/2015 | Sullivan et al. |
| 9,325,974 B2 | 4/2016 | Hébert et al. |
| 9,367,942 B2 | 6/2016 | Bares et al. |
| 9,953,618 B2 | 4/2018 | Ramachandran et al. |

(Continued)

FOREIGN PATENT DOCUMENTS

| | | |
|---|---|---|
| KR | 20170020210 A | 2/2017 |
| WO | WO-2009140261 A1 | 11/2009 |
| WO | WO-2018134686 A2 | 7/2018 |

OTHER PUBLICATIONS

Hosseinyalamdary, et al., Tracking 3D Moving Objects Based on GPS/IMU Navigation Solution, Laser Scanner Point Cloud and GIS Data, ISPRS International Journal of Geo-Information, 2015, 4, 1301-1316.

(Continued)

*Primary Examiner* — Nicholas R Wilson
(74) *Attorney, Agent, or Firm* — Nwamu PC

(57) ABSTRACT

Aspects of the disclosure are directed to methods and apparatuses involving 3D imaging. In accordance with certain aspects, a plurality of images of a 3D object are captured while movement of the 3D object is sensed by a sensor physically coupled thereto. The plurality of images include complementary portions and a feature of the 3D object. Pose data is generated for one of the plurality of images, based on data corresponding to the sensed movement and on the feature. The complementary portions are combined to generate a visual 3D image of the 3D object, based on the pose data.

13 Claims, 5 Drawing Sheets

(56) References Cited

U.S. PATENT DOCUMENTS

2017/0178392 A1    6/2017   Zuccarino et al.
2019/0073834 A1    3/2019   Holzer et al.

OTHER PUBLICATIONS

ProMove-Mini Product Datasheet, (2019) Inertia Technology, 2 pages, Available at: https://inertia-technology.com/wp-content/uploads/2019/08/ProMove-mini-datasheet.pdf.

3D IMAGING

BACKGROUND

Objects may be imaged in a variety of manners, to provide 3D representations of the object for a variety of applications. For example, 3D scanning can be useful for capturing 3D features of an object and providing a 3D image of the object. Imaging in 3D can also be used for 3D printing, such as to replicate an object. Further, 3D imaging can be used in virtual reality applications.

BRIEF DESCRIPTION OF FIGURES

Various examples may be more completely understood in consideration of the following detailed description in connection with the accompanying drawings, in which.

Figure 1:
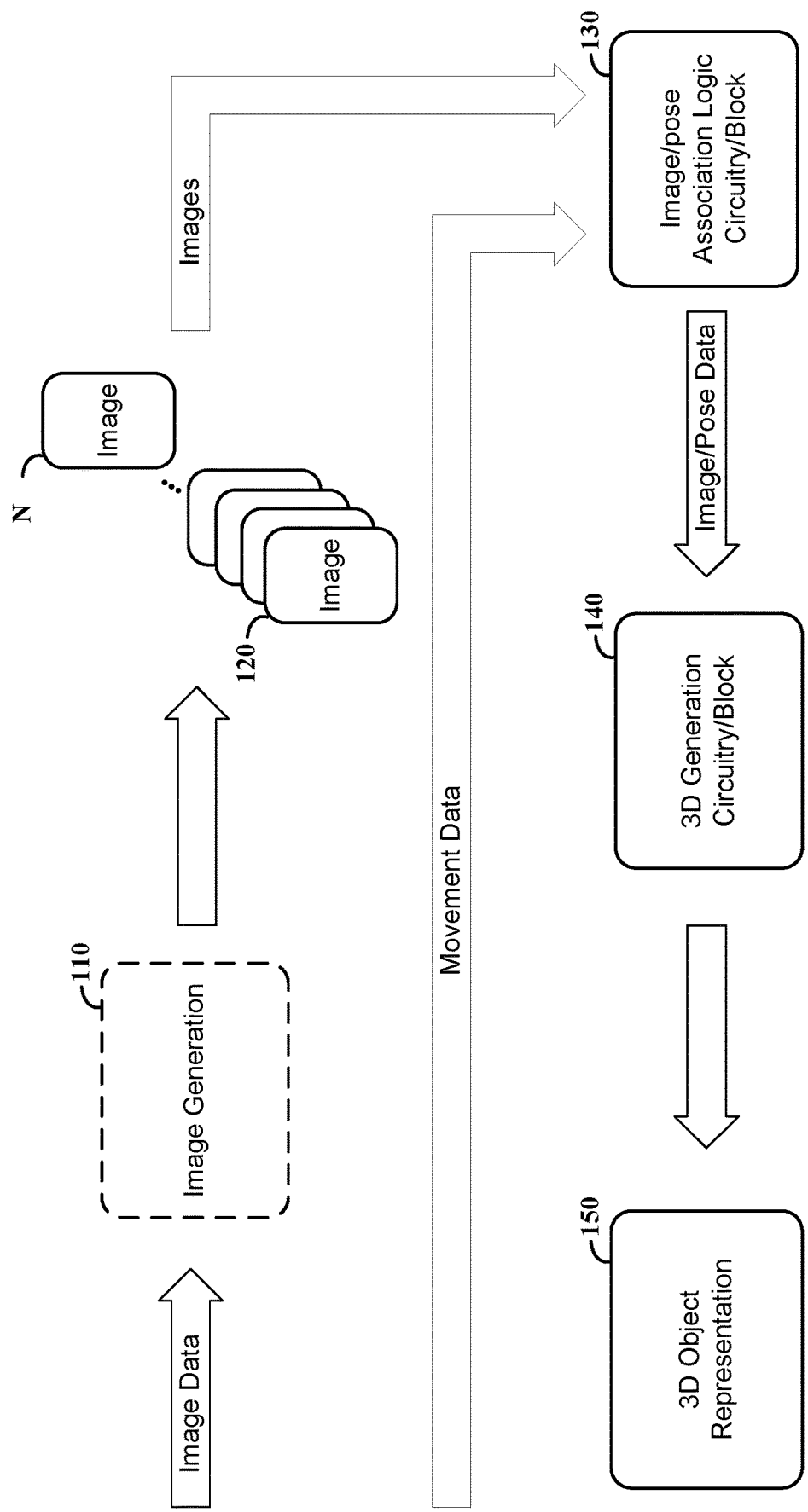
FIG. 1 illustrates an example apparatus and approach via which 3D images may be generated, in accordance with the present disclosure.

While various examples discussed herein are amenable to modifications and alternative forms, aspects thereof have been shown by way of example in the drawings and will be described in detail. It should be understood, however, that the intention is not to limit the disclosure to the particular examples described. On the contrary, the intention is to cover all modifications, equivalents, and alternatives falling within the scope of the disclosure including aspects defined in the claims. In addition, the term "example" as used throughout this application is by way of illustration, and not limitation.

DETAILED DESCRIPTION

Aspects of the present disclosure are believed to be applicable to a variety of different types of apparatuses, systems and methods involving imaging, and more particularly involving 3D imaging of objects in which movement information about the object is used in generating a 3D image or printing a 3D representation of the object itself, which may be scaled. In certain implementations, aspects of the present disclosure are beneficial when used in the context of imaging objects with sensors coupled to the object, directly or indirectly, for providing movement data, which can be used to generate pose data for images of the object as the object is moved and imaged. The pose data may be used together with images of the object to generate a 3D image, such as by using the pose data to characterize the position or a motion characteristic of the object as captured in respective images.

These approaches may, for example, facilitate the identification of features and/or the correlation of respective images that are combined for generating the 3D image, such as by extrapolating the shape of the object. For instance, certain shapes may exhibit surfaces that are difficult to differentiate from one another when imaged, which may present a further challenge to determining an orientation of the object in the respective images. This approach may facilitate differentiation of the surfaces and determination of the object's orientation. In this context, features may include color, texture, protrusions, declivities, smoothness, and edges, which may be characterized in this regard. In some examples, a portion of the images and/or of the resulting 3D image that depicts the sensor is removed or omitted, which may be useful in providing a 3D image of the object without the sensor depicted therein. While not necessarily so limited, various aspects may be appreciated through the following discussion of non-limiting examples which use various contexts.

As used herein, the term image refers to or includes a representation of an object, such as data that may be used to depict a visual or other image of the object or of features of the object, or data that depicts a certain characteristic of the object such as depth. As used herein, pose data refers to or includes location information as may include position, orientation or movement data pertaining to the object and/or a sensor, such as may relate to a surface characteristic of the object. The position data may include spatial coordinates, and the movement data may include a motion vector, acceleration, rotation, or other information that may be used to track an orientation of the object or, for example, a feature of the object. Such pose data may be generated from sensed motion, such as inertia data from an inertia sensor, and used with image data of an object on which the sensor is placed. Also as used in connection with imaging of an object herein, the term feature refers to or includes a portion of an object, such as may relate to a surface characteristic or point on an object, and may include color, texture, protrusions, declivities, smoothness, and edges.

In the following description various specific details are set forth to describe specific examples presented herein. It should be apparent, however, that other examples and/or variations of these examples may be practiced without all the specific details given below. In other instances, features have not been described in detail so as not to obscure the description of the examples herein. For instance, a variety of camera features, involving optics, circuitry and other components, may be utilized in connection with examples characterized herein. For ease of illustration, the same reference numerals may be used in different diagrams to refer to the same elements or additional instances of the same element. Also, although aspects and features may in some cases be described in individual figures, it will be appreciated that features from one figure or example may be combined with features of another figure or example even though the combination is not explicitly shown or explicitly described as a combination.

In accordance with a particular example, an imaging circuitry or an imaging block/module may generate a plurality of images of a 3D object having a sensor coupled thereto to sense movement of the 3D object. The images include complementary portions and a feature of the 3D object, and the feature may be depicted in more than one of the images. The sensor may be coupled in this regard via direct coupling to the 3D object, or to a structure in which the 3D object is held or located. Logic circuitry or a logic block/circuit may, for one of the plurality of images, generate pose data based on data corresponding to the sensed movement obtained via the sensor, and on the feature. The sensed movement may be correlated with the image based on respective times at which the image was obtained and the data corresponding to the sensed movement was obtained. In this context, the imaging block/circuit may be synchronized with the sensor for associating movement data with images, and may associate movement data received at the same time a particular one of the images is captured. Associating in this regard may involve storing data pertaining to the pose data and to data representing the images, along with data that indicates an association. Associating may also involve, or may alternately involve, storing the data with a time stamp that can be used to later associate pose data and image data received at or near a common time or time period. The logic circuitry may further combine the complementary portions based on the pose data to generate a visual 3D image or representation of the 3D object. Visual 3D image generation in this regard may, for example, involve removing or omitting portions of images that depict the sensor. Further, a surface of the object obscured by sensor images may be reconstructed, such as by using prediction/interpolation of an image of a surface obscured by the object based on other depicted portions of the object.

As characterized herein, complementary portions or surfaces of an image depict different surface regions of a 3D object that, when combined in a 3D representation, provide a 3D image of the object. For instance, images of complementary portions or surfaces may depict overlapping surfaces of a 3D object that, when combined using pose data to associate movement of the surfaces, create an accurate 3D representation of the 3D object. This approach may involve, for example, combining respective images of complementary surfaces that are similar in shape, curvature, color and/or texture, and that may be difficult to differentiate absent pose data that provides movement or position information about the images at the time they are captured.

In accordance with various examples, the plurality of images may include respective images depicting related ones of the complementary portions of the 3D object in which each respective image includes an image of at least one surface not in another one of the respective images. For instance, images of different complementary sides of a 3D object may be captured and the relative positions of the opposing sides may be ascertained via the pose data and combined accordingly.

The logic circuitry may be implemented in a variety of manners. In some implementations, the logic circuitry may output the visual 3D image to illustrate that the 3D object has planar surfaces, with respective ones of the images depicting different planar surfaces and each having a complementary portion such as an edge where the planar surfaces meet. In accordance with other examples, the logic circuitry may omit the sensor from the visual 3D image of the 3D object, based on physical characteristics of the sensor. For instance, known or imaged physical surfaces of the sensor may be identified and removed or omitted from the resulting visual 3D image that is generated. The logic circuitry may remove portions of the image depicting the sensor, and/or may modify portions of the image depicting the sensor.

In further examples, the logic circuitry may identify movement of the sensor for each of the plurality of images based on respective times at which each image is captured and at which the movement is sensed. The logic circuitry may assess the orientation or position of the object by using the identified motion of the sensor to characterize the orientation or position of the object for each image. The logic circuitry may generate the visual 3D image by combining data in the plurality of images based on the characterized orientation or position of the object in each image. The logic circuitry may also generate a 3D representation of a surface region of the object that is obscured by the sensor, based on ones of the plurality of images depicting ones of the surfaces that are adjacent the obscured surface region and the movement data. For instance, shape, texture, color, surface modulation, or other characteristics of the adjacent surfaces may be used in generating the 3D representation. The logic circuitry may also use the movement data to map points on a surface depicted in one of the plurality of images with common points on the surface depicted in another one of the plurality of images, and may output the visual 3D image using the mapped points.

In some examples, the logic circuitry may identify a location of the sensor in each image using the pose data, use the identified location of the sensor to characterize a position of the 3D object for each image, and generate the 3D representation of the 3D object by combining data in the plurality of images based on the characterized position of the 3D object. This may facilitate generation of the visual 3D image of 3D objects that do not contain discernable surface features, such as edges, texture, color, or declivities.

In certain examples, the apparatus includes the sensor and an enclosure that may receive and move the 3D object while it is imaged. The sensor may be physically coupled to the enclosure, and therein indirectly physically coupled to the 3D object. The imaging circuitry may capture the plurality of images of the object while the enclosure moves the object and while the sensor generates movement data. The logic circuitry may assess an orientation or position of the object being in motion by assessing the plurality of images relative to the movement data, and may generate the visual 3D image corresponding to the orientation or position and the plurality of images.

In accordance with another example, a non-transitory machine-readable medium may have instructions stored therein that, in response to being executed on logic circuitry, cause the logic circuitry to carry out the following. For a plurality of images of a 3D object depicting complementary portions and a feature of the 3D object, generate pose data for one of the images based on respective times at which the image was obtained and at which data corresponding to movement of the 3D object was obtained from the sensor. The logic circuitry further generates a visual 3D image of the 3D object by combining the complementary portions based on the pose data. Accordingly, logic circuitry in this regard may be implemented utilizing various circuitry as characterized herein, such as in connection with the logic circuitry noted above.

As a further example, a method may include capturing a plurality of images of the 3D object may be captured while the 3D object is in motion, in which the images include complementary portions and a feature of the 3D object. Pose data indicative of the 3D object being in motion may be generated based on movement data from a sensor physically coupled to the 3D object to sense movement thereof, and based on a feature in the images. The pose data may be associated with each image based on respective times at which the image was obtained and at which the movement of the 3D object was sensed, such as by synchronizing operation of the sensor and imaging circuitry used to obtain the images. A visual 3D image of the 3D object may be generated based on the plurality of images and the pose data associated with each image, by combining the complementary portions or surfaces based on the pose data. Generating the pose data may include, for example, generating movement data indicative of orientation of the 3D object such that the visual 3D image may be generated by combining the images based on the orientation of the 3D object indicated via the pose data.

In some examples, the sensor is physically coupled to a surface of the 3D object. Capturing the plurality of images may include capturing images of related ones of the complementary portions of the 3D object, with each complementary portion including at least one surface not in another one of the complementary portions. The visual 3D image may be generated as an image of the 3D object without the sensor coupled thereto, based on the plurality of images and based on physical characteristics of the sensor. In some examples, generating the visual 3D image may include generating a 3D representation of a surface region of the 3D object that is obscured by the sensor, based on portions of the 3D object depicted in images of the surfaces that are adjacent the obscured surface region. In other examples, generating the visual 3D image may include modifying portions of the plurality of images depicting the sensor and generating the visual 3D image using the modified portions of the plurality of images.

In accordance with another example, an apparatus may include an enclosure to receive an object to be scanned and to move the object while it is scanned or imaged. The apparatus may include a sensor physically coupled to the enclosure and generate movement data indicative of the object being in motion, and may include imaging circuitry to capture a plurality of images of the object while the enclosure moves the object and while the sensor generates the movement data. The apparatus may include logic circuitry that may assess an orientation or position of the object being in motion by assessing the plurality of images relative to the movement data, and that may output a visual 3D image corresponding to the orientation or position and the plurality of images. In certain examples, the sensor may generate the movement data indicative of movement of the enclosure, and the logic circuitry may assess the orientation or position of the object being in motion based on the movement of the enclosure.

In accordance with another example, an apparatus includes first logic circuitry that may, for each of a plurality of images relating to a 3D object having a sensor circuit coupled thereto, associate pose data pertaining to movement data obtained from the sensor circuit with the image based on respective times at which the image and the movement data was obtained. The apparatus includes second logic circuitry that may generate a 3D representation of the 3D object based on characteristics of each of the plurality of images and the pose data associated with each image. Such characteristics may include, for example, surface features, edges, shading, and coloring.

In some implementations, the apparatus may further include the sensor circuit and/or a different sensor circuit that may couple to the 3D object and that may transmit movement data indicative of position characteristics of the sensor circuit as the 3D object moves. The apparatus may also include communication circuitry that may receive the movement data from the sensor circuit. The apparatus may further include imaging circuitry that may generate, as the 3D object and imaging circuitry move relative to one another, the plurality of images depicting the 3D object and the sensor circuit coupled thereto. In this context, the second logic circuitry may generate a 3D image depicting the 3D object without the sensor by combining the images based on the movement data and based on physical characteristics of the sensor depicted in the images.

In accordance with another example, a method involves generating a plurality of images of a 3D object having a sensor coupled thereto, as the 3D object is moved. For each of the plurality of images, movement data may be obtained from the sensor and used to generate pose data associated with the image based on respective times at which the image and the movement data was obtained. A 3D representation of the 3D object may be obtained based on each of the plurality of images and the pose data associated with each image. The 3D representation of the 3D object may be generated in a variety of manners. In some examples, the 3D image of the 3D object without the sensor coupled thereto is generated, based on the captured images and based on physical characteristics of the sensor. In another example, a 3D representation of a surface region of the 3D object that is obscured by the sensor may be generated based on surface regions of the 3D object that are adjacent the obscured surface region. In certain examples, portions of the images depicting the sensor are removed, omitted and/or modified. In a particular implementation, a location of the sensor may be identified in each image using the pose data, and the identified location of the sensor may be used to characterize a position of the 3D object for each image. In this context, generating the 3D representation of the 3D object may include combining the images based on the characterized position of the 3D object.

Representations of 3D objects as generated in accordance with examples herein may be used in a variety of manners. For example, an image of a 3D object generated using pose data as characterized herein, which may be used to provide a 3D model or CAD drawing, may be utilized to generate a 3D image viewable on an electronic display and/or to 3D print a replica of the 3D object. In this context, 3D printing refers to generating a physical structure, which may involve extruding material, growing material, depositing material, or machining material. These approaches may be carried out under computer control, by processing individual images of the 3D object using the pose data to assist in combining the individual images to form a 3D representation of the 3D object, and by using the 3D representation to control the formation of the physical structure.

As another example, representation of 3D objects generated herein may be used in 3D scanning. Pose data is generated from movement data collected from a sensor attached to a 3D object and from images of the 3D object, and may be used to identify and track surface regions of the 3D object, such as by tracking position or ascertaining movement of the surface regions. This tracking may then be used in combining individual images such as 2D image frames together in forming a scanned 3D image of an object. Resulting images may be used for a variety of applications, including as examples the generation of video, virtual reality, orthotics and prosthetics.

Turning now to the figures, FIG. 1 illustrates an example apparatus and approach via which 3D images may be generated, in accordance with the present disclosure. Images 120-N of an object, as may be generated at 110 by a camera or other imaging device, are associated with pose data generated at block 130. The pose data may be generated using movement data received from a sensor that is coupled to the object being imaged, and may provide information useful in characterizing a position, motion or other characteristic of the object as the object is imaged. The associated image/pose data may be used at block 140 to generate and output a 3D object representation 150.

The apparatus and approach shown in FIG. 1 may be implemented in a variety of manners. For example, the pose data may be generated for each collected image, such as by correlating a time at which the movement data is received and a time at which a frame in a video is obtained, and then associated based on respective timing of the frames and movement data collection at block 130. The pose data for each frame may then be used to characterize a position of the object being imaged, such as by characterizing coordinates, velocity, acceleration, or a combination thereof. The position of the object for each image is used in combining respective images at block 140, such as by using the pose data to characterize which images are showing a common surface or surfaces of the object. This approach may be used to facilitate combination of images and image regions at block 140 with improved accuracy, which may be particularly useful with objects having surface regions that may be difficult to discern as part of a 3D imaging process.

Figure 2:
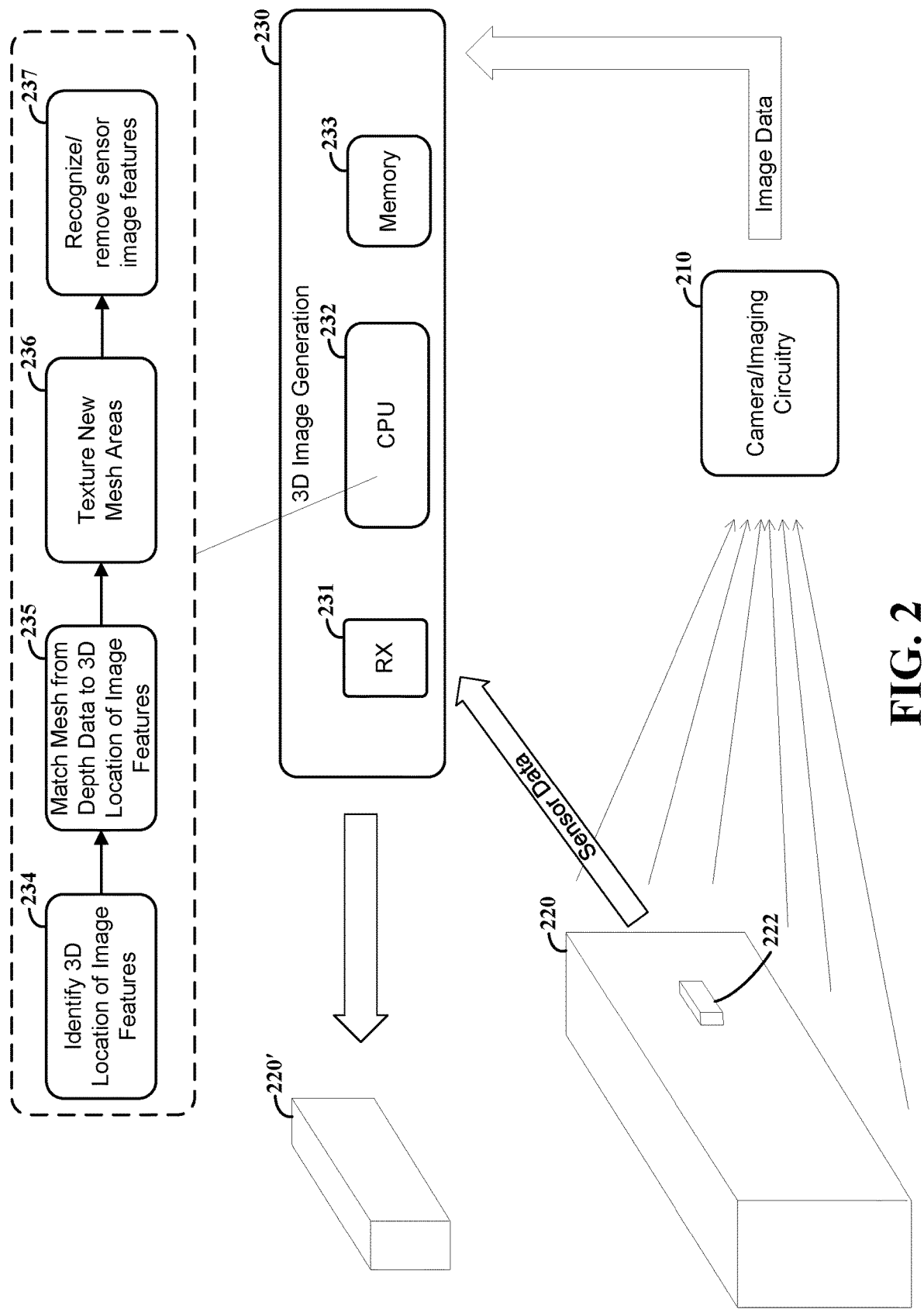
FIG. 2 illustrates an example apparatus and approach involving an imaging apparatus and sensor, in accordance with the present disclosure.

FIG. 2 illustrates an example apparatus and approach involving an imaging apparatus and sensor, in accordance with examples of the present disclosure. A camera or other imaging circuitry at block 210 collects image data from an object 220 (shown by way of example) having a sensor 222 coupled thereto. The camera/imaging circuitry 210 may provide image data to a 3D image generation block 230, which also receives sensor data from the sensor 222. The 3D image generation block 230 may include a receiver 231, central processing unit (CPU) 232 and memory 233, which may be implemented using various circuits. As an example, the receiver 231 may be implemented using an RF receiver circuitry for receiving WiFi broadcast data.

The sensor data characterizes a position or other position-related data for the object 220. For instance, the sensor data may characterize the orientation of the object 220 relative to the camera/imaging circuitry 210, which may be particularly useful for rotationally symmetric or feature-sparse objects. Characterizing the orientation may, for example, involve indicating a direction that a particular surface of the object 220 faces relative to the camera or other imaging circuitry at block 210, providing actual position data, or providing movement data. These approaches may be used in simultaneous localization and mapping (SLAM)-based shape capture, with the pose data being used to distinguish the various sides of the object 220, which may have similar surface regions.

The sensor data and image data may be combined, associated or synchronized in a variety of manners. For instance, pose data generated based on movement data obtained via the sensor 222 may be associated with image data obtained via the camera/imaging circuitry 210 based on respective times at which the image data was obtained and the pose data was obtained. This may involve using pose data indicative of rotation or motion, before, during and/or after a time at which a particular set of image data, such as for a particular still image, is obtained. Sensor and image may thus be synchronized for associating movement data with images. Consistent with the above, data pertaining to the pose data and to data representing the images may be stored in memory 233 along with data that indicates an association, or may involve storing the data with time stamps that can be used to later associate the sensor and image data.

In some implementations, 3D image generation at block 230 may be carried out in blocks 234-237, as follows. At block 234, a 3D location of image features may be identified for each respective image. This may involve using image or video frames with depth data, camera parameters, and pose data. The pose data may include frame/tag motion as may be ascertained from a sensor and/or via image tracking. SLAM techniques may be used to recover the 3D location, and in yet other implementations, a SLAM technique might characterize 3D aspects of the image using a 3D mesh at block 235. The 3D mesh may correspond to depth data of imaged portions of the object may be matched to the 3D location of the image features, and new mesh areas may be textured at block 236 based on the matching. In this context, the 3D mesh may include a virtual three-dimensional mesh of intersecting lines that follow surface contours of the object, with different portions of the surface lying at different depths relative to the camera/imaging circuitry 210. In certain implementations, previously unseen areas such as those masked by the sensor are added to the mesh at block 235. At block 237, sensor image features may be removed or omitted, such as by identifying the sensor in the images and removing those features or omitting those features when combining image data to faun the 3D image.

The various blocks/circuitry in FIG. 2 may be implemented independently or together, and various functions may be carried out at different components, to suit particular applications. For example, the camera/imaging circuitry and 3D image generation blocks may be implemented in a common device and/or on a common circuit. Further, certain functions or operations may be carried out at remote locations, such as by sending image and sensor data to remote processing circuitry that processes the information and generates a 3D representation of the object. For instance, blocks 234, 235, 236 and 237 may be carried out at a remote location with results being returned to the 3D image generation block 230. In certain instances the camera/imaging circuitry 210 collects the sensor data and provides it to the 3D image generation block 230.

In certain implementations, the apparatus and approach shown in FIG. 2 may be carried out in a mobile device such as a mobile telephone having a camera, wireless communication circuitry, and logic circuitry, which may respectively implement the camera/imaging circuitry block 210, receiver block 231 and memory 233. The camera may collect the image data from the object 220 and the wireless communication circuitry may collect the sensor data, such as by using Bluetooth, Wi-Fi or radio frequency (RF) communications. The memory circuit 233, which is an example of computer readable medium, which may be implemented to store computer-instruction code that is retrieved and executed by the CPU to cause the CPU to associate respective images or sets of image data with position data from the sensor 222. In response, the CPU generates 3D image 220' therefrom. Consistent with the above, the CPU may carry out activities in accordance with blocks 234, 235, 236 and 237, in creating 3D image 220'.

The sensor 222 may be implemented in a variety of manners. In some implementations, the sensor 222 includes an inertial measurement unit (IMU) attached to the object using a fastener, adhesive, such as a zip-tie, a spring-loaded car cellphone holder, a spring-loaded clamp, a suction cup, a frame with spring-loaded probes, a glue with minimal residue that releases when heated or that releases when frozen, a screw mount with counter-locking thumb nut, or other approach to creating a mostly rigid relationship between the object being scanned and the IMU.

Figure 3B:
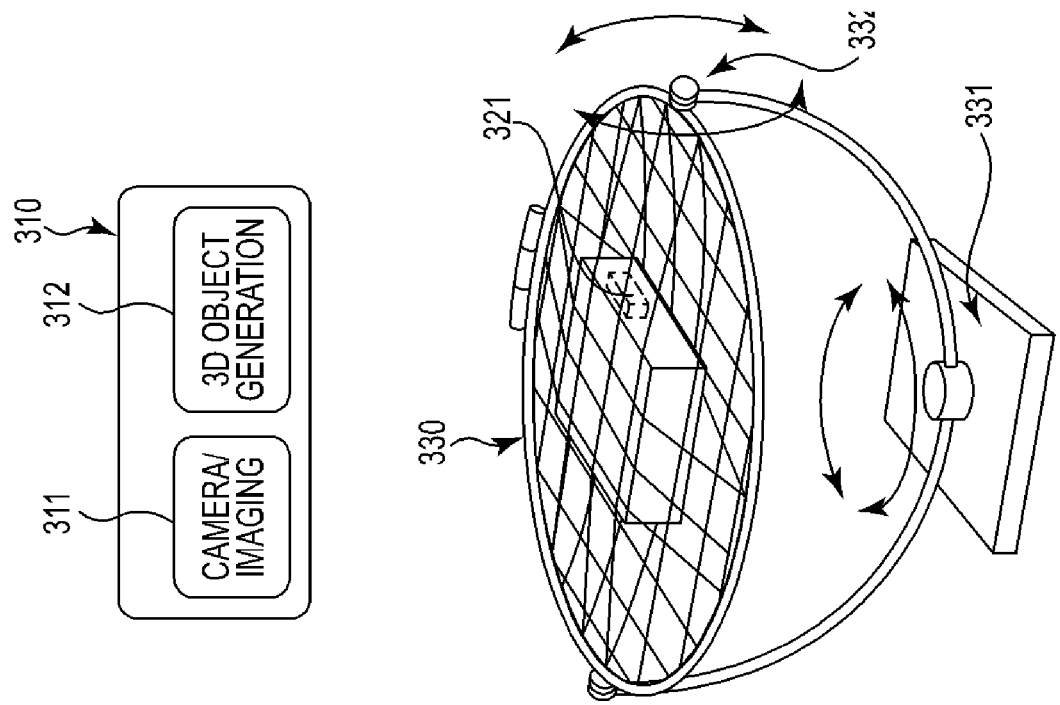
FIGS. 3A and 3B show an example imaging apparatus with respective sensors/sensor locations, in accordance with the present disclosure.
Figure 3A:
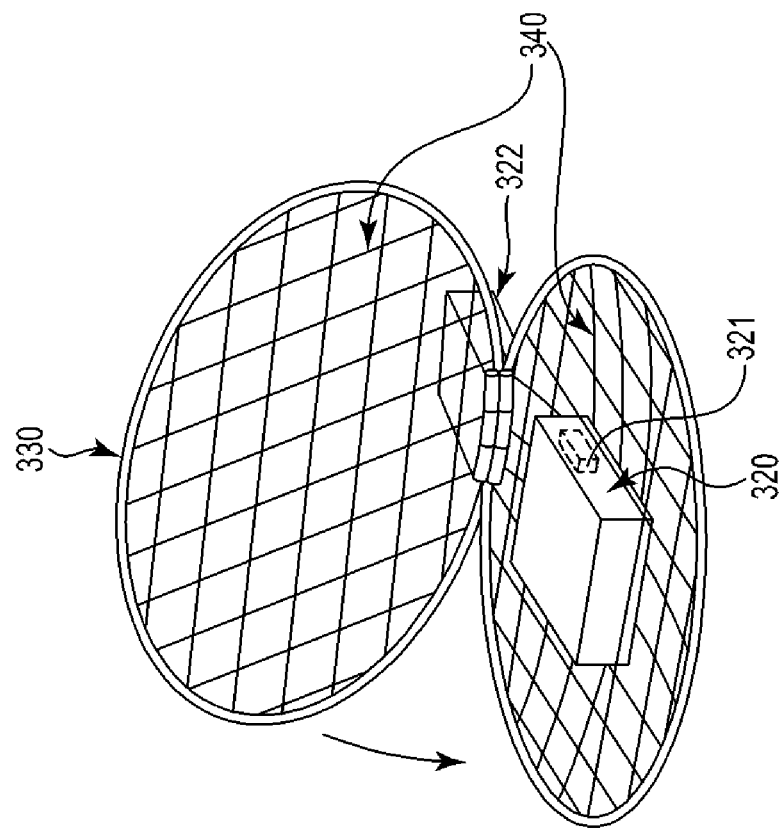

FIGS. 3A and 3B show an example imaging apparatus with respective sensors/sensor locations, in accordance with the present disclosure. An imaging or scanning block 310 may collect image data from an object 320, as well as movement data from a sensor or sensors, physically coupled directly or indirectly to the object 320. The imaging or scanning block 310 may include camera/imaging circuitry 311, and a 3D object generation block 312, which may respectively be implemented in accordance with the camera/imaging circuitry 210 and the 3D image generation block 230 as discussed with FIG. 2. The apparatus may include a support structure having a hinged frame 330, mesh 340 and hinges 331 and 332.

In some implementations, a sensor 321 may be coupled directly to the object 320. In other implementations, a sensor 322 may be remotely coupled to the object 320 via the frame 330 and mesh 340. In further implementations, a sensor in one or both of the hinges 331 and 332 may be utilized, and provide position data to the imaging or scanning block 310. The hinges 331 and 332 may include encoders, motion sensors, or other sensors that provide information about the position and/or movement of the hinged frame 330. In some implementations, sensors 321, 322 and those in hinges 331 and 332 are all utilized. In other implementations, one of sensors 321, 322 and those in hinges 331 and 332 is used while the others are omitted. Accordingly, various other sensors may be incorporated, directly on the object 320 or with the hinged frame 33, mesh 340 or hinges 331 and 332, to suit particular applications. Further, data may be obtained from the sensors via wired or wireless communication. The trajectory of object features tracked by the imaging or scanning block 310 may be compared to data obtained from sensor 321, 322 or those in hinges 331 and 332, to provide an estimate of the positions of those features relative to the sensors. Further, the frame 330 and hinges 331 and 332 may limit or eliminate translation of the object 320, and constrain rotation thereof to a vertical and a horizontal axis.

In certain examples, the frame 330 or mesh 340 may include passive or active fiducial markings that may be detected by the imaging or scanning block 310. Such fiducial markings may include, for example, a particular shape or color that is readily detected in an image, and may be used as a point of reference when depicted in different ones of the images. This may facilitate detection of a position and precise orientation of the frame 330 and/or mesh 340. This information may further be used to characterize pose data relative to the object 320.

In further examples, the imaging or scanning block 310 may remove or omit portions of the frame 330 or mesh 340 from images taken that include the object 320. In various examples, the mesh 340 may be transparent. Additionally and/or alternatively, the mesh 340 may be of a predetermined color to facilitate removal or omission of the mesh from images taken of the object 320. The color-based technique may be implemented so that the system ignores the IMU enclosure itself. For instance, the imaging or scanning block 310 may use detected motions of the sensor 321 and/or sensor 322 with a physical shape of the frame 330 and mesh 340 to remove or omit portions of an image that do not depict the object 320.

Figure 4:
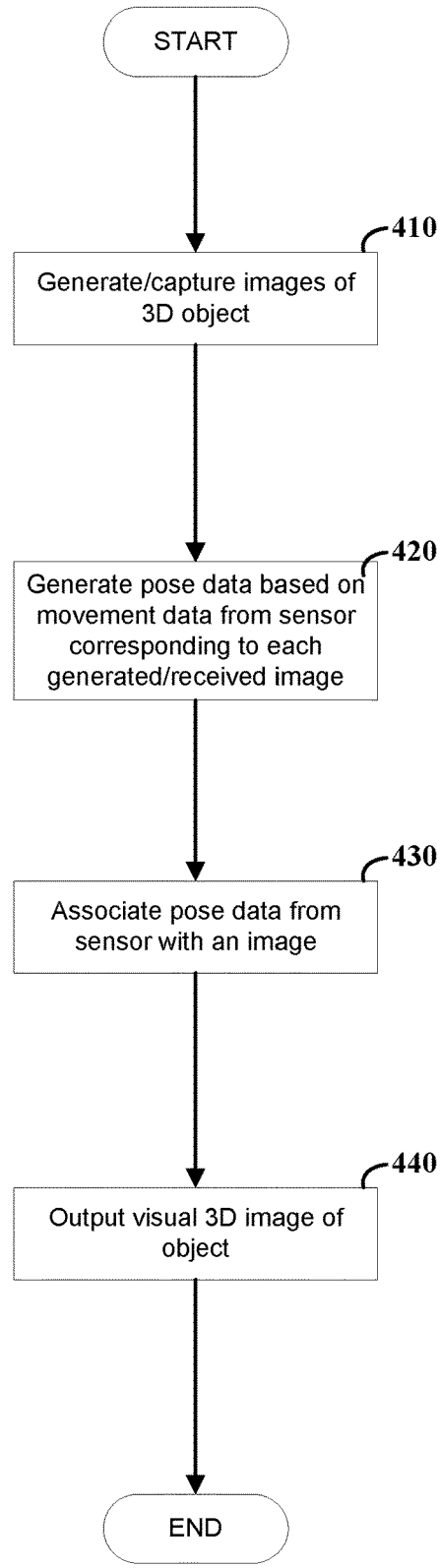
FIG. 4 shows an example flow diagram, in accordance with the present disclosure.

FIG. 4 shows an example flow diagram, in accordance with the present disclosure. At 410, images of a 3D object are received or captured, such as by receiving an image from a camera or generating an image based on light or other radiation data collected for an object. Pose data is generated at 420 based on movement data from a sensor coupled to the 3D object, such as by receiving a communication sent by the sensor. The movement data may correspond to respective ones of the images, relating information about the object for each image. The pose data may be associated with an image at 430, or may be associated with a plurality of the images at 430. This may involve, for example, correlating pose data for movement data received at a particular time with an image obtained at the same or similar time. At 440, a visual 3D image of the object may be generated from the images, such as by using the associated movement data to identify orientation or movement of a portion of the object being imaged. This may involve utilizing motion vector data to predict movement of object features in an image, for identifying or tracking such features from image to image. Such a visual 3D image may then be used for a variety of applications, such as to 3D print a replica of the 3D object, and which may be scaled.

Figure 5:
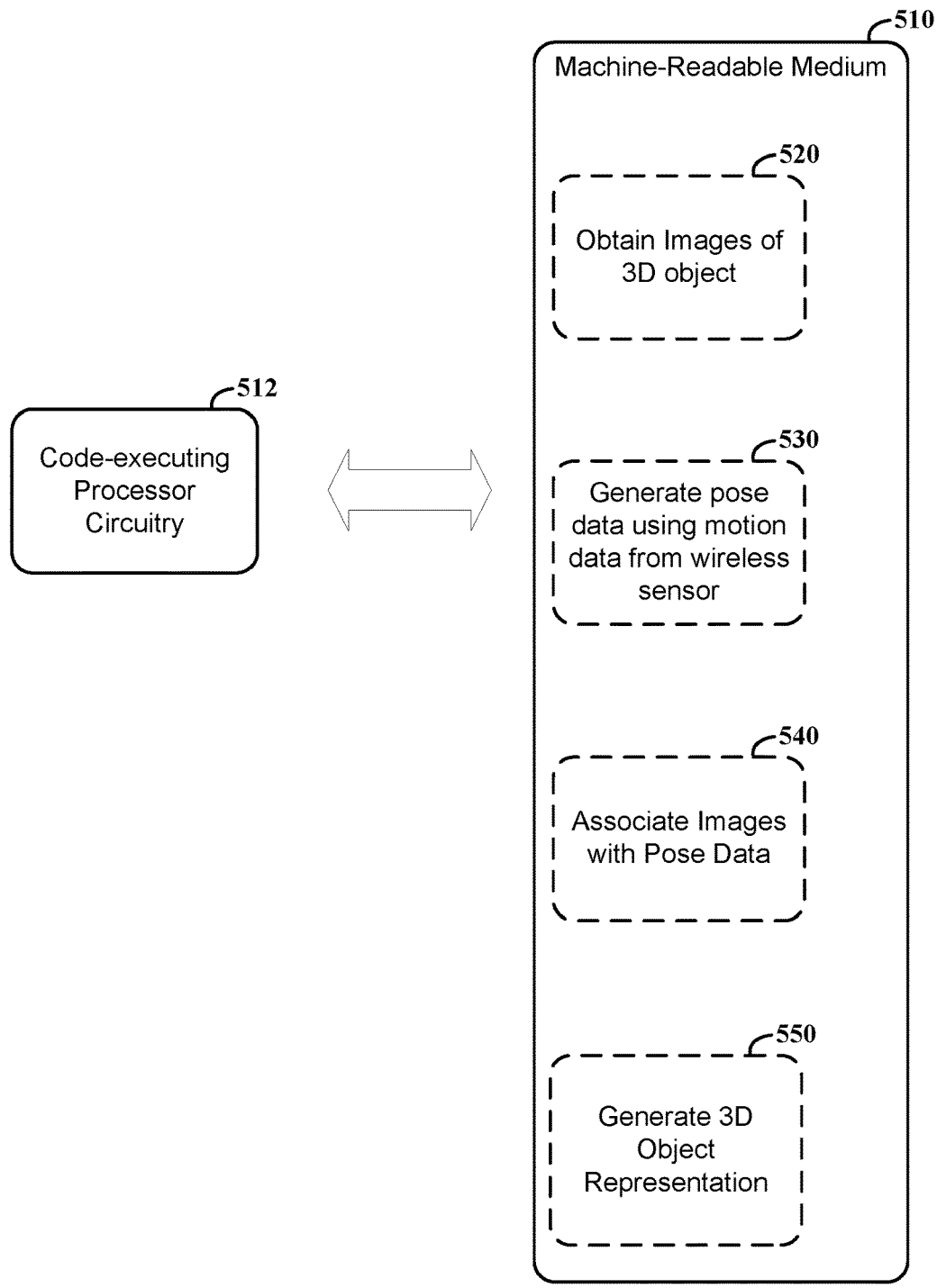
FIG. 5 shows an example apparatus having a non-transitory machine-readable medium storing computer-executable code, in accordance with the present disclosure.

FIG. 5 shows an example apparatus 500 having a non-transitory machine-readable medium 510 with CPU-executable instructions in accordance with the present disclosure. The machine-readable medium may, for example, include ROM, RAM, EEPROM, Flash memory, a solid state drive, and/or discrete data register sets. At 520, images of a 3D object may be obtained, such as by receiving image data from a camera or by generating image data from photo sensors. At 530, pose data may be generated from movement data obtained from a sensor coupled to the 3D object, directly or indirectly, in which the pose data may be indicative of position, motion or other characteristics of the sensor. At 540, the images may be associated with the pose data, such as by associating images taken at a particular instant or time window with pose data received during the same or similar instant or time window. A 3D object representation may be generated at 550 using the images and their associated pose data, such as by using the pose data to track or identify common features in different ones of the images. The apparatus 500 may also include a processor 512, which may carry out operations stored on the machine-readable medium, including those operations characterized by way of blocks 520, 530, 540 and 550, and as may include other operations or activities as characterized herein.

Various terminology as used in the Specification (including claims) connote a plain meaning unless otherwise indicated. As examples, the Specification describes and/or illustrates aspects useful for implementing the claimed disclosure by way of various structure, such as circuits or circuitry selected or designed to carry out specific acts or functions, as shown in the figures or the related discussion as depicted by or using terms such as blocks, modules, device, system, unit, controller, circuitry and/or other examples. See, for example, logic/CPU-related circuitry depicted by reference numerals 110, 130, 140 and 150 of FIG. 1, and also by the collective blocks illustrated in FIG. 5. Certain ones of these blocks may also be used in combination to exemplify how operational aspects, such as sensing movement or collecting images, have been designed, arranged, or implemented. Whether alone or in combination with other such blocks (or circuitry including discrete circuit elements such as photosensors or inertia sensors), these above-characterized blocks may be circuits that may be coded by fixed design and/or by (re)configurable circuitry such as CPUs, logic arrays, controllers and/or circuit elements to this end of the corresponding structure carrying out such operational aspects. In certain implementations, such a block, programmable circuit or processor refers to or includes computer circuits, including memory circuitry for storing and accessing a set of program code to be accessed/executed as instructions and/or (re)configuration data to perform the related operation, as in the form of carrying out a single activity or a more complex set of activities. Depending on the data-processing application, such instructions (and/or configuration data) may be implemented in logic circuitry, with the instructions (via fixed circuitry, limited group of configuration code, or instructions characterized by way of object code) as may be stored in and accessible from a memory (circuit).

Based upon the above discussion and illustrations, various modifications and changes may be made to the various examples without strictly following the examples and applications illustrated and described herein. For example, methods as exemplified in the Figures may involve activities carried out in various orders, with aspects of the examples herein retained, or may involve fewer or more operations. For instance, a variety of aspects indicated as being carried out by certain blocks, modules, circuits and other components may be carried out on a common device, such as a mobile phone, tablet or computer that integrates certain functions. Such devices may be fixed, such as relative to a scanning fixture, for scanning objects. In addition, generating a 3D representation of an object may include forming another object, such as by 3D printing the object, or machining the object out of a material block. Accordingly, such approaches may involve duplicating an object to be scanned, which may further be manipulated or scaled as desired. The 3D representation may include a 3D image of the object itself, using the pose data to determine orientation when it is being imaged. Further, a multitude of disparate types of objects may be 3D imaged, such as small hand-held objects that rotate as they are scanned with a camera, mobile device or scanner, or larger objects that are imaged as they move relative to a camera or other imaging device. As another example, certain functions may be stored on a computer-readable medium as instructions that, when executed by a processor, carries out the operations/activities. Such modifications do not depart from the scope of various aspects of the disclosure, including aspects set forth in the claims.

What is claimed is:

1. An apparatus comprising:
    imaging circuitry to generate a plurality of images, including complementary portions and a feature, of a 3D object having a sensor physically coupled thereto to sense movement of the 3D object; and
    logic circuitry to:
        for one of the plurality of images, generate pose data based on data corresponding to the sensed movement and on the feature, and
        combining the complementary portions to generate a visual 3D image of the 3D object, based on the pose data, wherein the sensor and an enclosure to receive and to move the 3D object while it is imaged, wherein:
    the sensor is physically coupled to the enclosure and is to generate the pose data;
    the imaging circuitry is to capture the plurality of images of the object while the enclosure moves the object and while the sensor generates the movement data; and
    the logic circuitry is to assess an orientation or position of the object being in motion by assessing the plurality of images relative to the movement data, and to generate the visual 3D image corresponding to the orientation or position and the plurality of images.

2. The apparatus of claim 1, wherein the complementary portions include surfaces of the 3D object, and wherein the plurality of images include respective images depicting related ones of the complementary portions of the 3D object, each of the respective images including an image of at least one surface portion not in another one of the respective images.

3. The apparatus of claim 1, wherein the logic circuitry is to output the visual 3D image to illustrate that the 3D object has planar surfaces, with respective ones of the images depicting different planar surfaces and each having a complementary portion where the planar surfaces meet.

4. The apparatus of claim 1, wherein the logic circuitry is to omit the sensor from the visual 3D image, based on physical characteristics of the sensor and the pose data.

5. The apparatus of claim 1, wherein the logic circuitry is to:
    identify movement of the sensor for each of the plurality of images based on respective times as at which the image is captured and at which the movement is sensed;
    assess the orientation or position of the 3D object by using the identified movement of the sensor to characterize the orientation or position of the object for each image; and
    generate the visual 3D image by combining data in the plurality of images based on the characterized orientation or position of the object in each image.

6. The apparatus of claim 1, wherein the logic circuitry is to generate a 3D representation of a surface region of the object that is obscured by the sensor, based on ones of the plurality of images depicting ones of the surfaces that are adjacent the obscured surface region and the movement data.

7. The apparatus of claim 1, wherein the logic circuitry is to:
    use the movement data to map points on a surface depicted in one of the plurality of images with common points on the surface depicted in another one of the plurality of images; and
    generate the visual 3D image by using the mapped points to arrange or combine the respective images.

8. A non-transitory machine-readable medium having instructions stored therein that, in response to being executed on logic circuitry, cause the logic circuitry to:
    for a plurality of images of a 3D object, the images depicting complementary portions and a feature of the 3D object as well as a sensor coupled to the 3D object and an enclosure,
    generate pose data for one of the plurality of images based on data corresponding to movement of the 3D object obtained from the sensor and on the feature, and
    generate a visual 3D image of the 3D object by combining the complementary portions based on the pose data; the sensor and the enclosure to receive and to move the 3D object while it is imaged, wherein the logic circuitry is to:
    cause capture of the plurality of images of the object while the enclosure moves the object and while the sensor generates the movement data; and
    assess an orientation or position of the 3D object being in motion by assessing the plurality of images relative to the movement data, and to generate the visual 3D image corresponding to the orientation or position and the plurality of images.

9. A method comprising:
    capturing a plurality of images of a 3D object while the 3D object is in motion, the plurality of images including complementary portions and a feature of the 3D object;
    generating pose data indicative of the 3D object being in motion, based on movement data from a sensor physically coupled to the 3D object and an enclosure to sense movement of the 3D object, and based on the feature of the 3D object in the images;
    associating the pose data with each image based on respective times at which the image was obtained and at which the movement of the 3D object was sensed; and generating a visual 3D image of the 3D object based on the plurality of images and the pose data associated with each image, by combining the complementary portions based on the pose data; wherein the plurality of images of the 3D object is captured while the enclosure moves the object and while the sensor generates the movement data; and assessing an orientation or position of the 3D object being in motion by assessing the plurality of images relative to the movement data, and generating the visual 3D image corresponding to the orientation or position and the plurality of images.

10. The method of claim 9, further including physically coupling the sensor to a surface of the 3D object and using the sensor to generate the movement data, wherein capturing the plurality of images includes capturing images of related ones of the complementary portions of the 3D object, each complementary portion including at least one surface not in another one of the complementary portions.

11. The method of claim 10, wherein generating the visual 3D image includes generating the visual 3D image of the 3D object without the sensor coupled thereto, based on the plurality of images and based on physical characteristics of the sensor.

12. The method of claim 10, wherein generating the visual 3D image includes generating a 3D representation of a surface region of the 3D object that is obscured by the sensor, based on portions of the 3D object depicted in images of the surfaces that are adjacent the obscured surface region.

13. The method of claim 10, wherein generating the visual 3D image includes modifying portions of the plurality of images depicting the sensor and generating the visual 3D image using the modified portions of the plurality of images.

* * * * *